United States Patent [19]

Wilde

[11] Patent Number: 5,991,753

[45] Date of Patent: *Nov. 23, 1999

[54] METHOD AND SYSTEM FOR COMPUTER FILE MANAGEMENT, INCLUDING FILE MIGRATION, SPECIAL HANDLING, AND ASSOCIATING EXTENDED ATTRIBUTES WITH FILES

[75] Inventor: Michael J. Wilde, River Forest, Ill.

[73] Assignee: Lachman Technology, Inc., Islandia, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/490,137

[22] Filed: Jun. 14, 1995

Related U.S. Application Data

[63] Continuation of application No. 08/077,858, Jun. 16, 1993, abandoned.

[51] Int. Cl.$^6$ .................................................. G06F 17/30
[52] U.S. Cl. .............................. 707/2; 707/204; 707/205
[58] Field of Search ................................... 395/620, 621, 395/488, 489, 444; 707/1, 2, 204, 205; 711/161, 162, 154

[56] References Cited

U.S. PATENT DOCUMENTS

| | | | |
|---|---|---|---|
| 4,864,616 | 9/1989 | Pond et al. | 380/25 |
| 5,251,152 | 10/1993 | Notess | 364/550 |
| 5,276,867 | 1/1994 | Kenley et al. | 395/620 |
| 5,313,604 | 5/1994 | Godwin | 395/489 |
| 5,317,728 | 5/1994 | Tevis et al. | 395/620 |
| 5,333,277 | 7/1994 | Searls | 395/281 |
| 5,367,698 | 11/1994 | Webber et al. | 395/800 |

OTHER PUBLICATIONS

R.K. Israel, et al.—Epooch Systems, Inc., Evolutionary Path to Network Storage Management (1991) pp.185–198.

S.R. Kleiman—Sun Microsystems, Inc., Vnodes: An Architecture for Multiple File System Types in Sun UNIX, pp. 238–247.

R. Sandberg, et al.—Sun Microsystems, Inc., Design and Implementation of the Sun Network Filesystem (1985) pp. 119–130.

NetArchive, Hierarchical Storage Management, File Migration, Network Archive (1992).

NetArchive, White Paper Concepts & Overview (1993).

N. Webber—Epoch Systems, Inc., Operating System Support for Portable Filesystem Extensions (1993) pp. 1–10.

*Primary Examiner*—Jack M. Choules
*Attorney, Agent, or Firm*—Kirkpatrick & Lockhart LLP

[57] ABSTRACT

A file management system and method for implementing special handling of files, useful for such applications as migration, compression, encryption, and logging access to files. A layer is superimposed between an underlying file system and programs' requests to access files. The layer initiates special handling in response to a file's normal attributes or information in the contents of the file and then passes the request to the underlying file system for normal proceeding. In the preferred embodiment, a file is recognized as a representation of a migrated file if the length attribute has a predetermined value and the file contains a unique pattern of bits.

31 Claims, 19 Drawing Sheets

FIG. 4
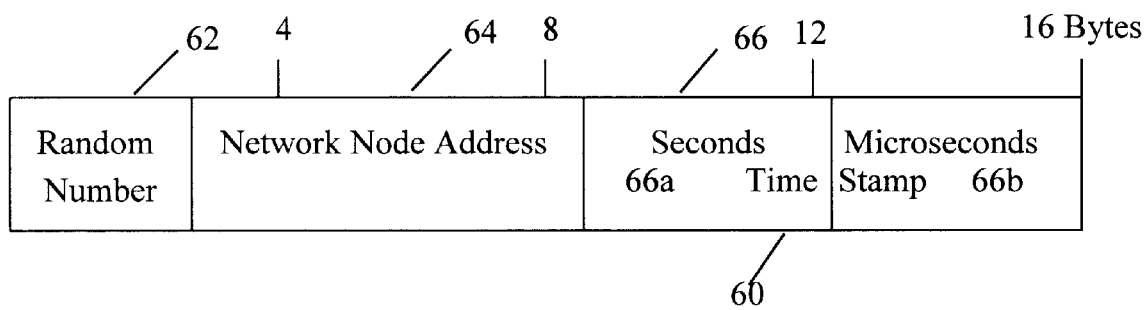
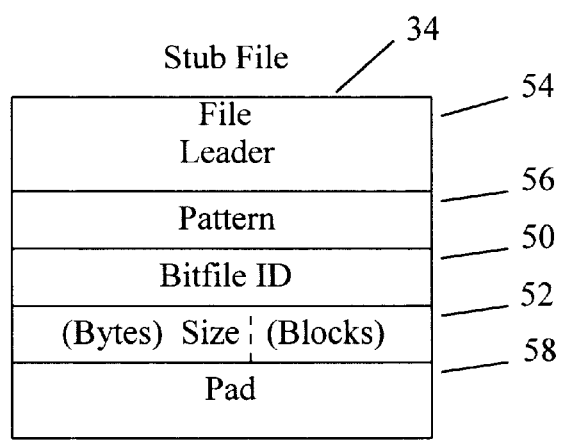
FIG. 5

```
/* vnode (v_flag) flags. */
define VMFS BUSY            0x080  /* being reloaded, etc. */
define VMFSWANTED           0x100  /* waiting for VMFSBUSY to reset*/
define VMFSRELOAD           0x200  /* waiting for migreload request to complete */

/* vfs (vfs_flag) flags. */
#define VFS_MFS             0x100  /* migration enabled for this fs */
#define VFS_MFSNOSPC        0x200  /* no space on this fs */
#define VFS_MFSRETRY        0x400  /* space now available: retry */

/* user structure flags. */
#define u_mfsflag u_XXX[2]
/* per-process data mode (3-bit field) */
#define MFS_DM_MASK         0x00000007
#define MFS_DM_NORMAL       0x00000000
#define MFS_DM_STUB         0x00000001
#define MFS_DM_ZLEN         0x00000002
#define MFS_DM_NOWAIT       0x00000003
#define MFS_DM_ERROR        0x00000007
/* per-process space mode */
#define MFS_SM_ENOSPC       0x00000005
/* real mode -- just call UFS */
define MFSREAL             0x00000008 include <sys/types.h>
        # include <sys/user.h>
        # include <sys/vnode.h>
        # include <sys/vfs.h>
        # include <sys/uio.h>
        # include <vm/seg.h>
        # include <ufs/inode.h> extern struct vnodeops ufs_vnodeops;

/* to save the REAL ufs vnodeops vector before overwriting ufs_vnodeops */
struct vnodeops rufs_vnodeops;

/* files that are this long are supected of having migration information.
         * for best performance, this number should be an unlikely file size.
         */
        # define MAGIC_SIZE 1023
```

FIG. 10a

```
struct mfspattern{
            char a[400];
};
/* a bitfile ID */
typedef struct bfid{
            u_char id[16];
}bfid_t;

/* migration information. size is logical size (that the user expects)
 * if mi.size is -1, this is not valid migration information
 * (this file just happens to have the magic size).
 */
struct mi{
            bfid_t bfid;
            long size;
            long blocks;
};

static int
mufs_rdwr (vp, uiop, rw, ioflag, cred)
            struct vnode *vp;
            struct uio *uiop;
            enum uio_rw rw;
            int ioflag;
            struct ucred *cred;
(
            int error;
            struct mi mi;
            struct timeval atime;
            int amode = u.u_mfsamode;

if(vp->v_flag&(VMFSBUSY | VMFSRELOAD) ) {
                    if(u.u_mfsflag&MFSREAL)
                            goto r;
                    mfs_wait (vp, VMFSBUSY | VMFSRELOAD);
            }
            if(VTOI(vp) - >i_size==MAGIC_SIZE) (
                    if(error=mfs_mi(vp, &mi, cred) )
```

FIG. 10b

```
                    return(error);
            if(mi.size ==-1)
                    goto r;
            switch(u.u_mfsflag&MFS_DM_MASK) {
            case MFS_DM_STUB:
                    go to r;
            case MFS_DM_ZLEN:
                    return (0);
            case MFS_DM_ERROR:
                    return (EIO);
            }
            if(rw==UIO_READ && uiop->uio_offset + uiop ->uio_resid<=512)
                    goto r;
            if(error=mfs_reload(vp, &mi.bfid) )
                    return(error);
     }
r:   for(; ;)(
            if(amode)
                    atime=VTOI(vp) ->i_atime;

error=(*rufs_vnodeops.vn_rdwr) (vp, uiop, rw, ioflag, cred);
            if(amode)
                    VTOI(vp)->i_atime=atime;

/* For Posix conformance: In ufs_rdwr(), if the last write
             * succeeded and now we're out of space, error is set to 0
             * and return the number of bytes not written in uio_resid.
             * The following check assumes a read never returns ENOSPC.
             */
            if(rw!=UIO_WRITE || (error!=ENOSPC && error!=0) ||
                    uiop->uio_resid==0 || (error=mfs_getspace(vp)))
                    break;
     )
     return (error);
)

/*
 * get what is suspected to be migration information for vp.
 */
mfs_mi(vp, mip, cred)
        struct vnode *vp;
        struct mi *mip;
        struct ucred *cred;
(
        int error;
```

FIG. 10c

```
        ASSERT ( (vp->v_flag &VMFSBUSY)==0);
        vp->v_flag|=VMFSBUSY;
        error=mfs_readmi(vp, mip, cred);
        mfs_rele(vp);
        return (error);
)
```

FIG. 10d

```
/*
 * read what is suspected to be migration information for vp from disk
 * into *mip.vnode should already be VMFSBUSY.
 *
 * format of a stub file:
 * offset        length        contents
 *    0          512           user data (fencepost)
 *  512          400           mfspattern
 *  912           33           bitfile ID (in hex, plus \n)
 *  945           24           file size (23 decimal digits, plus\n)
 *  969           20           block size (19 decimal digits, plus \n)
 *  989           34           reserved (33 dots, plus \n)
 * 1023
 */
mfs_readmi (vp, mip, cred)
        struct vnode *vp;
        struct mi *mip;
        struct ucred *cred;
(
        char *buf;
        struct iovec iovec;
        struct uio uio;
        struct timeval atime;
        int error;

/* initially assume invalid migration information (not a stub file) */
        mip->size=-1;

/* don't bother with directories and such */
        if(vp->v_type!=VREG)
                        return (0);

/* to read bytes 512 through 989 of the stub file (this could
         * be an automatic but don't want to use too much stack space) */
        buf=(char *)kmem_alloc(989-512);

/* set up to read the migration information into md and do it */
        iovec.iov_base=(caddr_t)buf;
        iovec.iov_len=989-512;
        uio.uio_iov=&iovec;
        uio.uio_iovcnt=1;
        uio.uio_offset=512;
        uio.uio_seg=UIO_SYSSPACE;
        uio.uio_resid=989-512;
```

FIG. 10e

```
/*
 * Even if the user doesn't have read access to the file,
 * use root credentials to read the stub so stat ( ) works.
 */
if(cred) (
        cred=crdup (cred);
        cred->cr_uid=0;
)

/* preserve access time */
mfs_getatime(vp, &atime, cred);

/* read the migration info. although calling UFS here, UFS
 * might in turn call through the VOP layer (actually, VOP_GETPAGE).
 * to avoid deadlock, MFSREAL makes the MFS intercepts pass the
 * request straight on through to UFS, rather than waiting until
 * MFSBUSY is off (mfs_wait()). */
u.u_mfsflag|=MFSREAL;
error=VOP_RDWR (vp, &uio, UIO_READ, IO_UNIT, cred);
u.u_mfsflag&=-MFSREAL;

(*mfs_find(vp)->setatime) (vp, &atime);
if(cred)
                crfree(cred);
if(error) (
                kmem_free(buf, 989-512);
                return (error);
)

/*valid migration info if the patern matches */
if (!bcmp(buf, (caddr_t) &mfspattern, sizeof(mfspattern)))(
                /* this is valid migration information */
                adtobfid(&buf(912-512), &mip->bfid);
                mip->size=adtoi (&buf(945-512), 23);
                mip->blocks=adtoi (&buf(969-512), 19);
)
kmem_free(buf, 989-512);
return(0);
)
```

FIG. 10f

```
static int
mufs_mkdir (dvp, nm, va, vpp, cred)
        struct vnode *dvp;
        char *nm;
        struct vattr *va;
        struct vnode **vpp;
        struct ucred *cred;
(
        int error;

for (; ;) (
                error=(*rufs_vnodeops.vn_mkdir) (dvp, mn, va, vpp, cred);
                if(error!=ENOSPC || (error=mfs_getspace(dvp)))
                        break;
        )
        return (error);
)

mfs_getspace(vp)
        struct vnode *vp;
(
        if(u.u_mfsflag&MFS_SM_ENOSPC) || !(vp->v_vfsp->vfs_flag&VFS_MFS))
                        return(ENOSPC);
        vp->v_vfsp->vfs_flag|=VFS_MFSNOSPC;
        while(vp->v_vfsp->vfs_flag&VFS_MFSNOSPC)
                sleep ((caddr_t)&vp->v_vfsp->vfs_flag, PINOD);
        return (vp->v_vfsp->vfs_flag&VFS_MFSRETRY?0:ENOSPC);
)
```

FIG. 10g

```
struct mfs_node {
        struct mfs node *m_next;            /* link for mnode list */
        struct mfs_node*m_qnext             /* link for reload/error queue*/
        struct vnode*m_rvp;                 /* real vnode of underlying VFS*/
        long m_qtime;                       /* time (sec) reload was queued */
        long m_errtime;                     /* time (sec) last error is valid */ int m_rlfence;                      /* valid data on reload/unload */
        int m_error;                        /* error during reload/unload?? */
        int m_rloff;                        /* lowest offset waiting for reload */ int m_flag;                         /* reload, archive, stub, queued */
        mfs_lock_t m_lock;       /* mutex */
        struct mi m_mi;                     /* migration info for mnode */
        struct vattr m_va;                  /* cached "real" attributes */
        struct vnode m_mv;                  /* vnode struct for MFS VFS */
};
typedef struct mfs_node mfs_node_t;
#define MTOV(x) (&((x)->m_mv))
#defineVTOM(x) ((mfs_node_t *) ((x)->v_data))
#define VTOR(x) (VTOM(x)->m_rvp)
/*
 * read what is suspected to be migration information for vp from disk into
 * *mip. vnode will be nlocked for calls mfsioct.l(), but not for calls
 * from mfs_makenode().
 *
 * format of a stub file:
 * offset              length         contents
 *     0               512            user data (fencepost)
 *     512             400            mfs pattern
 *     912             33             bitfile ID (in hex, plus \n)
 *     945             24             file size (23 decimal digits, plus\n)
 *     969             20             block size (19 decimal digits, plus \n)
 *     989             34             reserved (33 dots, plus \n)
 *     1023
 */
mfs_readmi(vp)
        struct vnode *vp;
(
        caddr_t buf;
        struct iovec iovec;
        struct uio uio;
        int error;
        mfs_node_t *mp = VTOM(vp);
        mfs_vfsinfo_t *mvp = VPTOMF(vp);
        cred_t *crp;
        struct timeval atime;
        int fsize;
```

FIG. 11a

```
ASSERT (vp->v_type ==VREG);
/*
 * to read bytes 512 through 989 of the stub file (this could be
 * an automatic but don't want to use too much stack space)
 */
mp->m_mi.size = -1;

/*
 * Even if the user doesn't have read access to the file, I use
 * root crpentials to read the stub so stat () works, and get the
 * real file attributes to figure out where the migration info
 * lives . . .if there might in fact be such info
 */
if ( ( error = mfs_getsize (vp, ..& fsize) ) | | (fsize !=mfp->m_magicsz) )
            return (error);

/ * set up to read the migration information into md and do it */
crp = crget();
crp->cr_uid = 0;
buf = mfs _kmem_fast_alloc(&mfs_mi_head, 2*MIGOFFSET, 4);
iovec.iov_base = buf;
iovec.iov_len = MIGSIZE;
uio.uio_iov = &iovec;
uio.uio_iovent = 1;
uio.uio_offset = fsize - MIGOFFSET +1;
uio.uio_seg = UIO_SYSSPACE;
uio.uio_resid = MIGSIZE;

mfs_getatime(vp, &atime);              /* preserve access time */
error = VOP_RDWR (mp->m_rvp, &uio, UIO_READ, IO_UNIT, crp);
mfs_setatime(vp, &atime);              /* reset access time */
crfree|crp);

/* valid migration info if the pattern matches */
if (!error && !uio.uio_resid &&
        !bcmp(buf, (caddr_t) & mfspattern, sizeof (mfspattern))) (
                /* this is valid migration information * /
                adtobfid(&buf(MIGBFIDOFF), &(mp->m_mi.bfid));
                mp->m_mi.size = adtoi (&buf[MIGSIZEOFF], MIGSIZESIZ);
                mp->m_mi.blocks = adtoi (&buf[MIGBLOCKOFF], MIGBLOCKSIZ);
                mp->m_stub = 1;
                mp->m_rlfence = MIGOFFSET;    /* XXX configurable XXX */
)
mfs_kmem_fast_free(&mfs_mi_head, buf, 2 * MIGOFFSET, 4);
return (error);

```
/*ARGUSED*/
static int
mfs_rdwr(vp, uiop, rw, ioflag, crp)
        struct vnode *vp;
        struct uio *uiop;
        enum uio_rw rw;
        int ioflag;
        cred_t *crp;
(
        int error = 0;
        mfs_node_t *mp = VTOM(vp);
        struct timeval atime;
        int offset = uiop->uio_resid + uiop->uio_offset;

#ifdef MFS_DEBUG
        mfs_print(4, "mfs_rdwr: vp x%x rvp x%x\o", vp, VTOR(vp));
endif /*
         * Assume that any migration info is read when vnode is first
         * referenced via lookup and is kept up to date...
         */
        if (mp->m_archive && (rw == UIO_WRITE)) (
                /* XXX writes after fence that don't change size XXX */
                error = mfs_warchive(vp, uiop->uio_offset,
                                        uiop->uio_resid, rw);
        )
        if (!error && mp->m_stub) (
                switch (curproc_mfsdflag) (
                case MFS_DM_STUB:
                        break;
                case MFS_DM_ZLEN:
                        return (0);
                case MFS_DM_ERROR:
                        return (EIO);
                default:
                        if ((rw != UIO_READ! || (offset > MIGOFFSET)) (
                                error = mfs_wreload(vp, uiop->uio_offset,
                                        uiop->uio_resid, rw);
                        )
                        break;
                )
        )
        if (error)
                return (error);
        if (curproc_mfsamode)
                (void)mfs_getatime(vp, &atime);
rdwr_retry:
                error = VOP_RDWR(VTOR(vp), uiop, rw, ioflag, crp);
```

FIG. 11c

```
/*
 * For Posix conformance: In ufs_rdwr(), if the last write
 * succeeded and now we're out of space, error is set to 0 and
 * return the number of bytes not written in uio_resid. The
 * following check assumes a read never returns ENOSPC.
 */
if ((error == ENOSPC) ||
        (!error && uiop->uio_resid && rw == UIO_WRITE) ) (
                if ((error = mfs_getspace(vp)) == 0)
                        goto rdwr_retry;
)
if |curproc_mfsamode)
        (void)mfs_setatime(vp. &atime);
return (error);
```

FIG. 11d

```
/*
 * arbitrary 400-byte pattern used to recognize migration info
 */
struct mfspattern mfspattern =
{
        ' ', '/n, 'T', 'M', 'F', 'S', 'v', '0', '1',
        '/n',
        'v', 'd', 's', 'x', 'f', 'x', 's', 'z',
        'w', 'q', 'd', 'z', 'e', 'q', 'z', 's',
        'n', 't', 'p', 'e', 'r', 'e', 'o', 'd',
        's', 'q', 'g', 'i', 't', 't', 'o', 'f',
        'f', 'm', 'w', 'z', 'f', 'g', 'k', 'l',
        'r', 'd', 'a', 's', 'i', 'p', 'e', 'b',
        'j', 'o', 'd', 'i', 'n', 'j', 'b', 'i',
        'e', 'w', 't', 'b', 'm', 'm', 'h', 'n',
        '\n',
        'l', 'l', 'l', 'q', 'q', 'a', 'a', 'm',
        'z', 'm', 'z', 'h', 'g', 'd', 't', 'u',
        'n', 'p', 'a', 'z', 'p', 'l', 'q', 'g',
        'h', 'j', 't', 'l', 'k', 'h', 'a', 'x',
        'y', 's', 't', 't', 'x', 'd', 's', 'l',
        'l', 'i', 's', 'v', 'm', 'g', 'k', 'o',
        'x', 'y', 'r', 'm', 'c', 'r', 't', 'w',
        'a', 'l', 't', 'i', 's', 'm', 'o', 'c',
        '/n',
        'k', 'a', 'a', 'o', 'i', 'o', 'z', 'd',
        'd', 'h', 'x', 'n', 'l', 'x', 'l', 'j',
        'l', 'l', 'l', 'w', 'i', 's', 'o', 'n',
        'r', 'q', 'g', 'i', 'f', 'w', 'j', 'l',
        'w', 'x', 'v', 'y', 'z', 'a', 'q', 'z',
        'i', 'd', 'v', 'c', 'n', 'k', 'e', 'w',
        'f', 'c', 'k', 'k', 'x', 'a', 'l', 'n',
        'v', 'n', 'g', 'k', 'o', 'd', 'r', 'u',
        '\n',
        'f', 'a', 'q', 'e', 'f', 'r', 'q', 'u',
        'r', 'c', 'o', 'h', 'a', 'k', 'a', 'z',
        'k', 'h', 'c', 'j', 'b', 'v', 'f', 'f',
        'y', 'g', 'k', 'h', 'b', 'u', 't', 'b',
        'k', 'e', 'i', 'q', 'w', 'h', 's', 'u',
        'p', 'z', 's', 'j', 'w', 'u', 's', 'd',
        'm', 'u', 'f', 'n', 'q', 'i', 'j', 'o',
        'b', 'u', 'e', 'q', 'b', 'v', 'd', 'c',
        '\n',
        'l', 'd', 'a', 'f', 'x', 'u', 'j', 'm',
        'm', 't', 'c', 't', 'n', 'i', 'j', 'a',
        'r', 'd', 'm', 'r', 'a', 'c', 'm', 'e',
        'b', 'a', 'z', 'd', 'm', 'k', 'm', 'c',
        'k', 'f', 'j', 'u', 'f', 'm', 'b', 'y',
        'f', 'f', 'r', 'j', 'a', 'o', 'm', 'b',
        'x', 't', 'o', 'y', 'j', 'u', 'v', 'p',
        'l', 'f', 'f', 'd', 'n', 'e', 'o', 'j',
        '\n',
        'a', 'u', 'y', 'n', 'z', 'w', 'k', 'i',
        'u', 'z', 'x', 'r', 'h', 'q', 'l', 'm',
        't', 'u', 'n', 'l', 'b', 'y', 'z', 'd',
        'a', 'r', 'm', 'e', 'c', 'n', 'f', 'n',
        'd', 'b', 't', 'w', 'e', 'l', 'j', 'm',
        'r', 'o', 'l', 'e', 's', 'y', 'k', 'h',
        's', 'u', 'y', 's', 's', 't', 'b', 'y',
        'i', 'x', 'q', 'j', 'k', 'd', 'k', 'e',
'\n',
};
```

FIG. 12

METHOD AND SYSTEM FOR COMPUTER FILE MANAGEMENT, INCLUDING FILE MIGRATION, SPECIAL HANDLING, AND ASSOCIATING EXTENDED ATTRIBUTES WITH FILES

This is a continuation of application Ser. No. 08/077,858, filed Jun. 16, 1993 of Michael J. Wilde now abandoned.

This invention relates to file representation systems and methods for computer systems. In particular, this invention relates to methods and systems for representing computer files that require special handling.

BACKGROUND OF THE INVENTION

Changing the representation of data in a file has many useful advantages. For example, compressing infrequently used files can save significant storage space. Encrypting an important file can secure secret information. However, the responsibility for remembering that some files require decompression, decryption, or some other kind of special handling before they can be used for normal reading and writing rests with the user. Failing to perform the special handling in the proper way wastes time. For example, failing to decompress a file before launching a process that reads the file wastes time by causing error conditions that must be cleared before processing can continue.

Another area involving files that require special handling is the area of file migration. File migration addresses the problems of how best to use multiple data repositories, for example on networks of workstations. Users frequently run out of space on the data repositories connected to their computers, and then must spend time deleting the less frequently used files, or, worse, users are unable to add significant amounts of important data to their systems because of insufficient space. In some situations, data will be lost because available storage space has dipped below a critical level at the same time a user is attempting to add data to his system, and the system has no means of recovery other than discarding buffers and killing processes.

One approach to solving this problem is to store frequently used data on high speed magnetic disk devices and store less frequently used data on slower but cheaper types of storage media or on removable storage media such as tapes or optical disks. This approach is only a partial solution to the storage problem and creates additional problems. For example, someone, either a user or a system administrator, is required to spend time moving the files, and each user has to keep track of which of his or her files have been moved and where they have been moved.

One proposed method of managing data repositories for networks of workstations and fileservers automatically moves files from high-speed storage to low speed storage. This process is called "migration" or "staging," and the repositories that receive the migrated files are called "migration stores." Using migration requires that there be some means of keeping track of which data files have been migrated to migration stores and an identification of the location of the files. Some existing systems use approaches that store this information in files that acts as catalogs of migrated files. This approach suffers from a number of problems. These systems have difficulty recovering from some types of common system or disk errors, and their implementation requires modifications to file system utilities.

One such system is described in Israel et al. *Evolutionary Path To Network Storage Management*. USENIX, Winter '91 pp.185–198. That article describes a staging method wherein each workstation file system has a file that is a catalog of the migrated files. The catalog lists all migrated files by their inode numbers. If the catalog file is lost, all migrated data files are potentially inaccessible to the workstation. Secondly, this approach requires rewriting some file system utilities. For example, some file system backup and restore utilities read or write directly from or to the raw disk. When a backup tape that was made using such a backup utility is restored the inode numbers of most of the files usually change, making the catalog file useless and the migrated files inaccessible. Consequently, to use this migration approach, the backup and restore utilities must be modified.

In other systems, such as BUMP and Novell 4.0, the underlying file system itself is modified. For example, the inode data structure can be modified to include an extra bit that identifies an inode as corresponding to a migrated file. This approach suffers from being highly unportable, and requiring rewriting an extensive amount of the file system and file system utilities.

It is an object of the invention to provide a file management system for effectively dealing with compressed files, encrypted files, migrated files, or any other data files that require special handling, in a way that is transparent to users, to application programs, and to system utilities, such as backup and restore packages.

It is an object of the invention to provide a file migration system that is free from single points of failure and that does not depend on file system details, such as inode numbers, for critical operation.

It is a further object of the invention to provide a file migration system which contains information indicating the files that have been migrated the information identifying the location of the contents of the original data file.

It is another object of the present invention to provide a file migration system wherein the migration system operating software determines whether a file on a primary data repository represents a migrated file simply by examining its attributes.

It is a further object of the invention to provide a file migration system wherein the migration system operating software determines whether a file represents a migrated file by first examining at least one normal attribute of the file and then, if necessary, examining the contents of the file.

It is yet a further object of the present invention to provide a file management system supporting the use of extended attributes.

SUMMARY OF THE INVENTION

All of these objects and others are achieved using a file management system wherein files receive special handling in a way that is transparent to the user. An intercept layer intercepts calls to the file system that request access to files. The intercept layer is a layer of code that is superimposed between an underlying file system and programs that issue requests to access files. This layer is separate and distinct from the underlying file system and does not include or replace any portion thereof. There is no alteration of any structural data owned by the underlying file system. For example, on a UNIX file system, installing the intercept layer does not change the on-disc format of inodes or directories.

The intercept layer determines whether the file to be accessed is a file that is to receive special handling by examining the file itself, (i.e. attributes and data). If the examination of the file indicates that it is not to receive special handling, the intercept layer simply passes the file access request to the underlying file system for normal processing. If the file is to receive special handling, the intercept layer performs the special handling and makes the original file available to the underlying file system. This latter step can be accomplished in a number of ways. For example, in the case of a compressed file, the intercept layer will cause the file to be decompressed and then, if necessary, will forward the access request to the underlying file system for normal processing.

In one embodiment of the invention, files that receive special handling are files that have been migrated to a migration store and might need to be reloaded before the access request can be processed. The files that receive special handling are represented by stub files. Each stub file has an unusual combination of one or more of the normal file attributes that are provided by the underlying file system. For example, each stub file could have an unusual size, such as 1023 bytes. The actual size of the migrated file can be stored in the stub file. In other embodiments, different unusual sizes (e.g., 1023 bytes, 1022 bytes, etc.) indicate different types of special handling, (e.g., a size of 1023 bytes would indicate the file has been migrated, a size of 1022 bytes indicates the file has been compressed, etc.).

It can be desirable to indicate the need for special handling using solely a combination of normal attributes. For example, on a UNIX system there are a number of attributes normally present in an inode that can be used. For example, a combination of an unusual size and an unusual date or timestamp are used to uniquely identify a file that is to receive special handling. The true, original values of the altered attributes are stored in the file.

Alternatively, a stub file can have an unusual attribute such as size, and a unique pattern of bits stored in the stub file for confirming that the file is a stub file and not a file that co-incidentally has the altered attribute. This approach can be very practicable if the altered attribute is chosen so that very few non-stub files have the chosen attribute value.

In one embodiment of the invention, the files that receive special handling contain the information necessary to perform the handling. For example, in a file migration system, the location of the migrated file is specified in the stub file itself. Copying the stub file, for example onto a backup tape, and then restoring it, preserves in the stub file all the information necessary for the intercept layer to retrieve the migrated file.

In this embodiment, the intercept layer determines whether the requested file is a stub file by examining its attributes, and, if necessary, looks for the unique pattern. If the intercept layer determines that the file is a stub file then it may use the migration information to reload the migrated file, if necessary.

In this embodiment, a file is migrated by first copying the contents of the file to a remote storage device. Then, the original file is truncated to 512 bytes and appended with the above-described information, including the unique pattern, to result in a file that is 1023 bytes in length.

In some embodiments of the invention, it is not practical to force the files that are to receive special handling to all have the same value of an attribute or a combination of an attribute. For example compressed or encrypted files can be of any size, and it is not possible to reduce them all to 1023 bytes. However, each compressed or encrypted file can be altered so that its last block of data has a specified size. Alternatively, a compressed or encrypted file can be copied to another location and replaced by a fixed-length stub file which contains an identification of the location of the fixed file. Alternatively, other normal attributes could be used.

The invention also provides for associating with a file attributes that are not provided by the underlying file system. These attributes, called "extended attributes", are provided by including the extended attribute information in a file at the end of the file and altering the size of the file so that the last block of data has a specified length. The extended attributes would not be directly visible to a user during normal operation of the computer system. Instead, an interface layer would intercept file access requests from the user's processes and would itself respond to the extended attributes in the file, or provide them to applications through a programmic interface defined for that purpose. The benefit of this method of storing extended attributes in that they can be retained along with ordinary file data, even as files are copied, transmitted, backed-up and/or recovered, transparently to the utilities that provide those functions.

BRIEF DESCRIPTION OF THE DRAWINGS

FIG. 4 is a schematic of a bitfile ID.

FIG. 5 is a schematic of a stub file.

FIG. 10a through 10g are a listing of a first embodiment of an intercept version of the rdwr( ) and mkdir( ) procedures.

FIGS. 11a and 11d are a listing of a second embodiment of an intercept version of the rdwr( ) procedure.

FIG. 12 is a listing of a pattern used to identify a file as a stub file.

DETAILED DESCRIPTION

Figure 1:
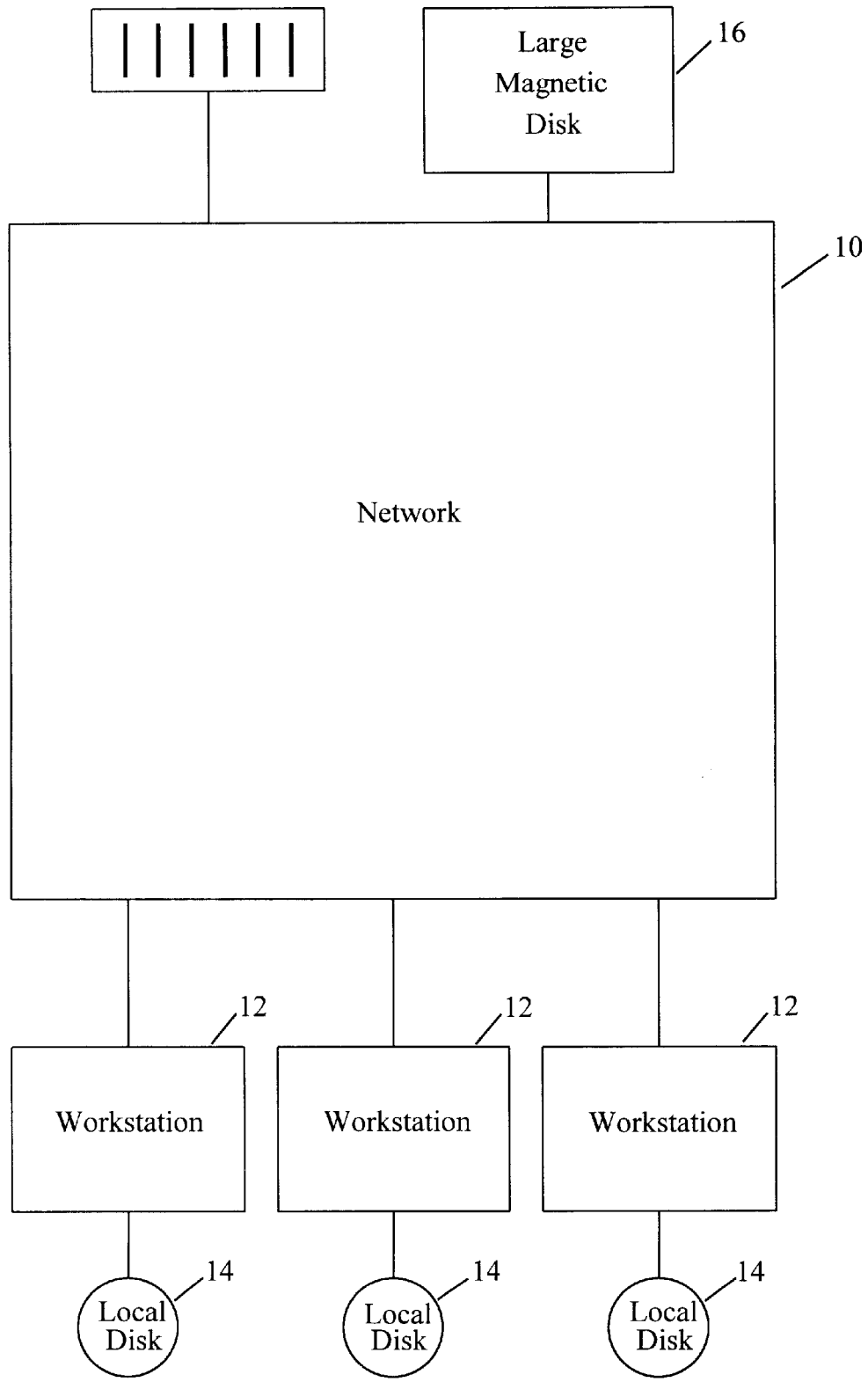
FIG. 1 is a schematic of a network of workstations using an embodiment of the present invention.

To illustrate the present invention, an embodiment comprising a file migration system will be described herein and illustrated in FIG. 1. This embodiment includes a network 10 of workstations 12, each running a version of the SunOS operating system, such as 4.1.3. Other types of remote connections besides networks could be used to connect computers together with data repositories in the use of the invention. The term remote connection as used herein does not include internal buses. Other computers could be used in addition to or instead of workstations, such as servers, personal computers, or other computers known to persons having ordinary skill in the art. Furthermore, the invention is not limited to SunOS and may be implemented on any operating system, such as UNIX, MS-DOS, OS/2, and the Macintosh operating system, to name a few.

Each workstation 12 is equipped with its own magnetic data repository, local disk 14. Of course, other types of storage media could be used for local disk 14. It is preferable to use faster types of storage media for the local disk 14, and slower types for the migration stores.

This embodiment also includes a large magnetic data repository device 16 on the network 10 that is available to each workstation. Also connected to the network 10 is an optical disk juke box 18. Other data repositories could be accessible to the network 10, including tape drives, optical disk drives, tape juke boxes (or automatic tape loaders), write-once-read-many times (WORM) optical disk drives or juke boxes (or automatic disk loaders), or other automatic libraries and other data repositories known to persons having ordinary skill in the art. The migration system manages the migration of files from magnetic drives 14 associated with each workstation 12 to each of the above-mentioned other data repositories. Alternatively, each workstation 12 could have more than one data repository attached directly to it and could migrate files among the more than one local data repositories.

Figure 2:
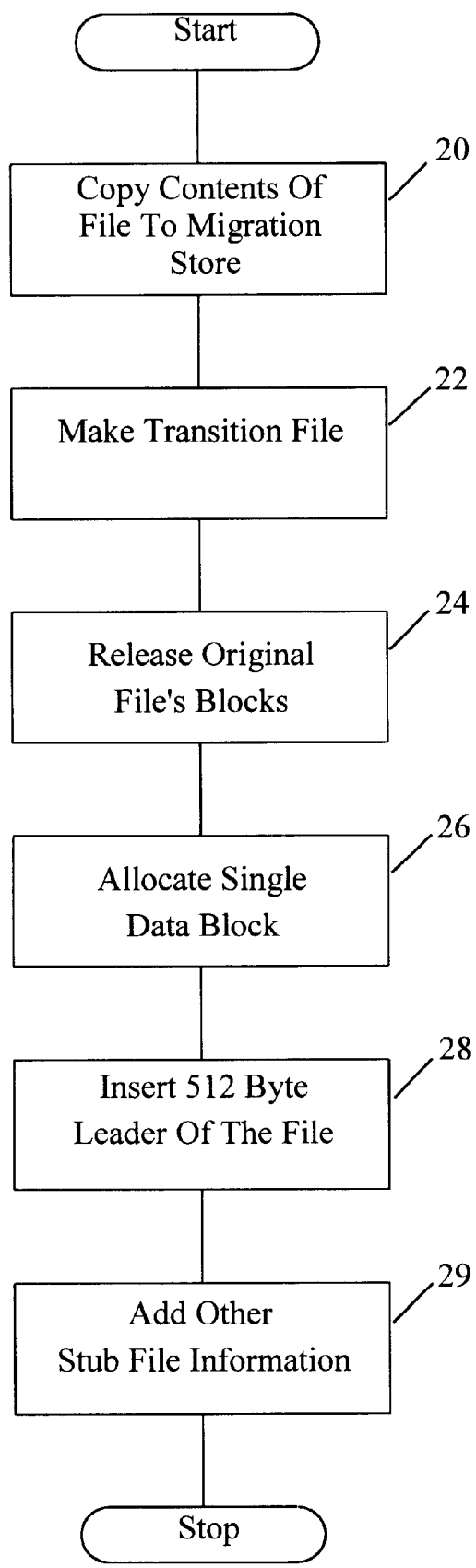
FIG. 2 is a flow chart showing a basic migration process using the present invention.

The process of moving a file to a migration store is illustrated in FIG. 2. The contents of the file are first copied to the store in step 20 resulting in the return of a bitfile ID. Then, a copy of the original file is made in step 22 on the local disk. This copy, called the transition file, is maintained in case the migration process is interrupted before the stub file is complete. Should that happen, a recovery process can replace the partly-built stub file with the transition file, or, if the bitfile ID of the migrated file is still available, complete the migration process by building the stub file.

After making the transition file, all of the blocks of original file are released. Then, in step 26, a single data block is allocated. These two steps avoid fragmentation. In the next step 28, the first 512 bytes of the file are copied into the newly allocated data block. This portion of the file is called the "file leader" and is not required to be 512 bytes in length for the purpose of using the invention. The file is then appended in the step 29 with the information described below in connection with FIG. 5 and the transition file is deleted.

Figure 3:
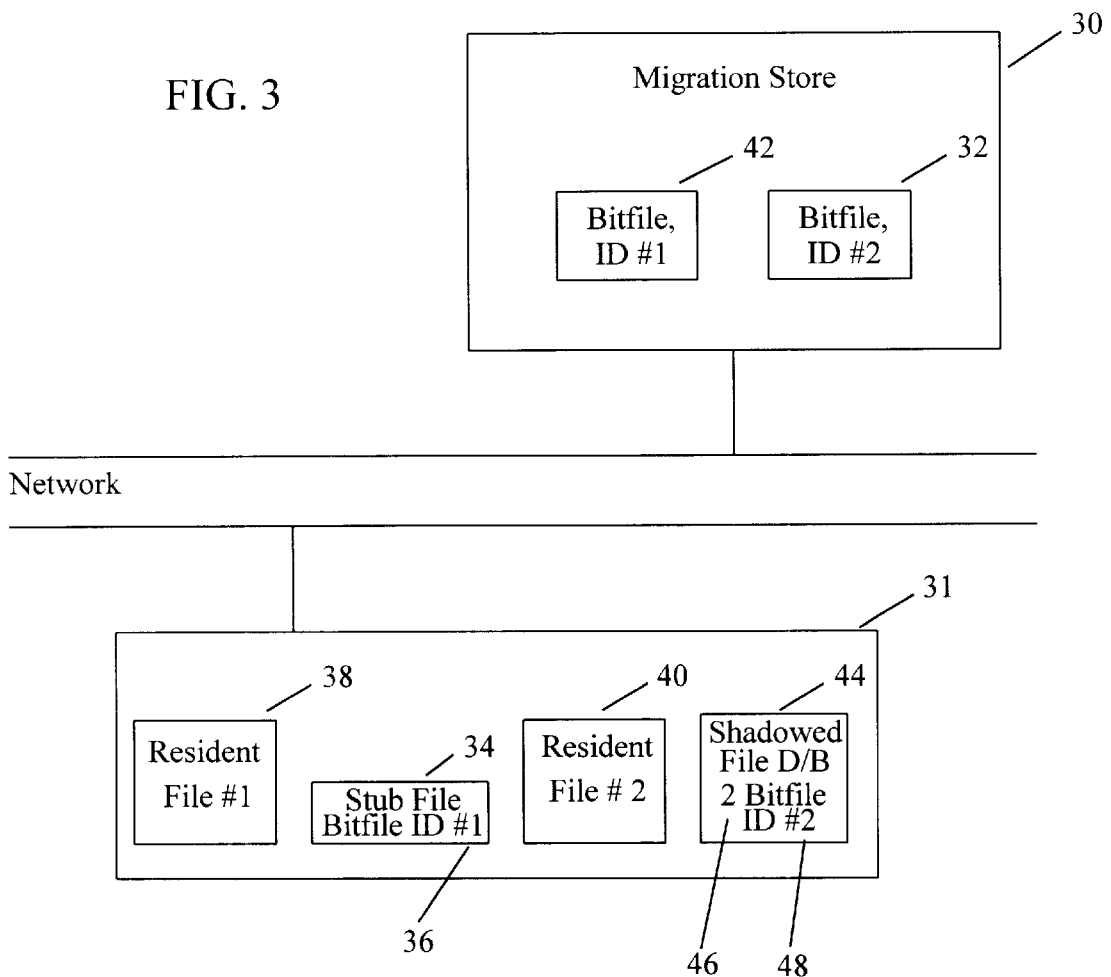
FIG. 3 is a schematic of a workstation on the network of FIG. 1 illustrating the various types of files that exist in the operation of one embodiment of the present invention.
Figure 6:
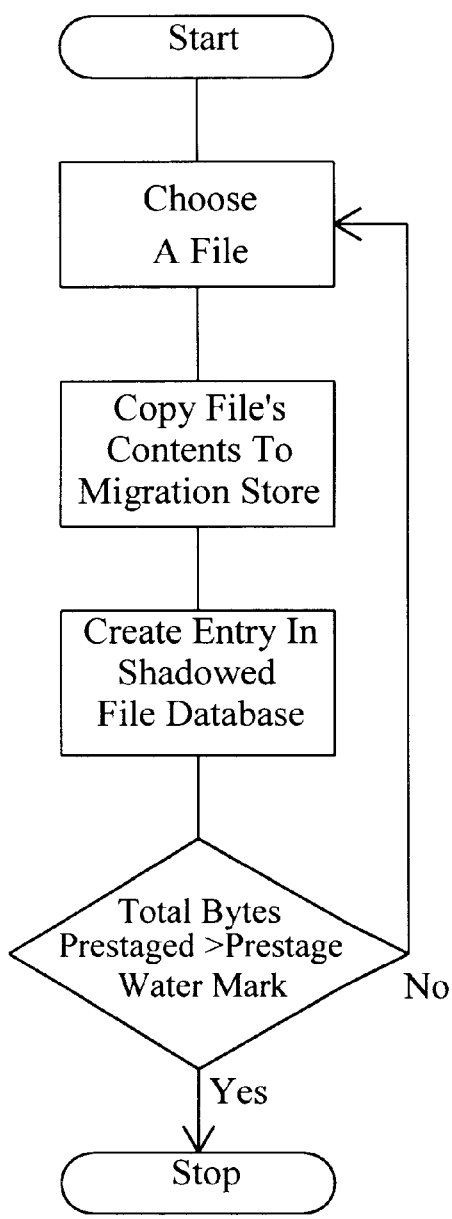
FIG. 6 is a flow chart of a prestaging process using the present invention.

As illustrated in FIG. 3, a file is migrated by copying the file to a migration store 30 on a remote storage device, such as the large magnetic disk 16 that is available to all the workstations 12 on the network 10. The migrated copy 32, called a bitfile, contains all the contents of the original file. The stub file 34 is what remains of the original file after the original file has been truncated to a smaller size with the insertion of additional information necessary to recognize the file as a stub file, to locate the bitfile, and to preserve any altered attributes.

Referring to FIG. 5, the stub file 34 contains a bitfile ID 50, the logical size 52 of the migrated file, some number of leading bytes of the migrated file, the pattern of bytes 56 that serves to identify this file as a stub file, and a 34 byte pad 58 that is reserved by the system of the preferred embodiment. The logical size 52 is stored both as the number of bytes and as the number of disk blocks. The stub file includes the logical size of the migrated file so that systems can provide the actual size of the migrated file to system utilities that request the size (e.g. ls -1). The stub file 34 contains as many of the leading bytes of the file data as possible. This is known as the file leader 54. In the embodiment under consideration, the file leader 54 is set at 512 bytes. Truncating the file to a file leader that is 512 bytes long (by first truncating to zero bytes and then adding 512 bytes of the file leader) and then adding the above-described information results in a file that is 1023 bytes in length.

In the preferred embodiment, the system recognizes a stub file in a two-step process. First the system looks for an unusual configuration of the normal attributes. In UNIX systems, normal attributes of files include their size, creation time, modification time, read/write/execute permissions and their owner. In other operating systems files can have additional or different attributes. In the preferred embodiment, stub files all have the same unusual size, namely 1023 bytes. Therefore when accessing a file, the system first determines whether the file is 1023 bytes in length. A file having this size might be a stub file.

However, the size alone does not determine that a file is a necessarily stub file, because an ordinary file might coincidentally have a length of 1023 bytes. Consequently, the contents of stub files are also provided with a sufficiently unique bit pattern that serves to confirm that the file is indeed a stub file. The pattern shown in FIG. 12 illustrates a pattern used in an actual system to verify that a file is a stub file. This pattern is 400 bytes long; however the size of the pattern is not a limitation on the invention, and a much smaller pattern could suffice.

It is also possible to indicate stub files solely by the use of an internal pattern of bits without relying on an unusual normal attribute. However, this approach is not preferred because it requires that each time a file access request is intercepted that the file be opened and its contents examined, thus being more expensive in computation time than the preferred method of using a normal attribute to identify stub files or to at least eliminate most files from consideration relatively cheaply.

Another embodiment would verify the existence of a stub file without examining the contents of the file. Instead, examination of one normal attribute would confirm that a file was a stub file. For example, the stub could have a false creation time set for two hundred years in the future. For example, all stub file could have a creation date of noon, Jan. 1, 2100 A.D. In this embodiment the real creation date of the specially handled file would be stored in the contents of the stub file. This is so system utilities such as ls -1 can be provided with the real creation date.

Still another embodiment would determine the existence of the stub file by examination of two normal attributes. For example, a unique size of 1023 bytes would suggest that a file might be a stub file. The existence of a unique creation date would then confirm that a file was a stub file. In this embodiment, both the real creation date and the actual length of the migrated file would be stored in the contents of the stub file. This embodiment would have advantages over the embodiment that examined only the creation time, such as prevention of the inadvertent or deliberate creation of false stub files.

Once the system has confirmed that the file is a stub file, the system reloads the file by use of the bitfile ID. However, if the access request only requires reading from the file leader, reloading the file is unnecessary, and is not done, resulting in faster access.

As illustrated in FIG. 4, the bitfile ID 60, in the present embodiment of the invention, has three components: a three byte random number 62, a six byte network node address 64 on the system on which the bitfile ID is generated, and a seven byte time stamp 66 which in itself consists of four bytes of seconds 66a plus three bytes of microseconds 66b. The random number 62 makes the bitfile ID 60 difficult to guess. The network node address 64 makes the bitfile ID 60 unique across systems. The time stamp 66 makes the bitfile unique within the current system and helps make the bitfile ID 60 difficult to guess. The format of bitfile ID 60 is not a required format of bitfile IDs. The invention could be used with other formats of bitfile IDs, and other methods of identifying a migrated file may be used instead of bitfile IDs, as will be understood by persons of ordinary skill in the art.

The fact that the stub file contains the bitfile ID means that if the stub file is copied, or backed-up and restored, it still references the migrated file. The problems created by using inode numbers as a part of the connection between the migrated file and the location of the original file are thus avoided. The fact that each bitfile ID 60 is unique means that bitfiles can be moved from one migration store to another without conflicts over duplicate bitfile IDs. It also means that the stub files, which contain bitfiles IDs, can be moved between different file systems.

The bitfile ID also provides a measure of security. Guessing bitfile IDs is difficult because there are many more possible bitfile IDs than bitfile IDs actually used and the ones that are used are selected more or less evenly from the range of possible ones. It is practically impossible for a user to guess a bitfile ID that references an actual bitfile that is currently in use. The system could also hamper automated guessing of bitfile ID's by inserting an artificial time delay whenever an invalid bitfile ID is passed through the migration store. There is also no part of the migrating file process, other than the routine that actually generates bitfile IDs, that is aware of, or interprets, the fields of the bitfile ID. The rest of the process simply treats bitfile IDs as arrays.

The operation of the file migration system of the preferred embodiment is illustrated in FIG. 3. In the system illustrated in FIG. 3, there are two resident files 38 and 40 and one non-resident file 32. In a file system supporting migration, files are always in one of two primary states: resident or nonresident. A resident file is a file with all of its contents stored on the local disk. A non-resident file is one that has been migrated. With a resident file, both the attributes of the file and its contents are located on the local disk 31. When first created, all files are resident files.

A non-resident file is a file that has been migrated; its contents have been copied to a migration store 30 and the original file turned into a stub file 34. Although the contents of a non-resident file are on the store 30, all its normal attributes are kept on the local disk 31. It is only when a file's contents are accessed that the store copy 32 is reloaded and the file becomes resident again. Other than speed of access of the file's contents, non-resident files are indistinguishable from resident files.

Non-resident files are reloaded when any of the following actions occur: (1) data beyond the file leader (e.g., first 512 bytes) is read, (2) data is written anywhere within the file, or (3) the size of the file, or possibly some other attribute, is changed. If the reload is triggered by a read request, the previously non-resident file is copied to the local disk 31 and the bitfile ID is stored in a file called the shadowed file database 44, as explained more fully below. If the reload is triggered by any type of modification, the connection to the old bitfile is broken. The connection is also broken if a file that was reloaded for reading is subsequently modified. In this instance, the connection is broken by deleting the file's entry in the shadowed file database. A new bitfile ID and a new bitfile will be generated when the modified file is next prestaged or migrated. The old bitfile will be retained on the store for some period of time, to permit the restoration of the original stub file to create a fully-accessible file.

There are three types of migration: explicit, periodic, or demand. The present invention provides for all three. Explicit migration is initiated by a user request using, in the present embodiment, a supplied, UNIX style command called migrate. Periodic migration is initiated by an administrative job. In the present embodiment, this administrative job is usually automated via the cron utility of UNIX. Periodic migration preferably occurs during non-peak times to bring space utilization down to a predetermined level. Finally, demand migration is initiated when space is exhausted during normal operation, for example by a daemon.

The initiation of periodic or demand migration triggers the following sequence of events. First, a list is generated of all the files in the file system that are eligible for migration, along with migration attributes. These migration attributes would include, for example, UID, GID, age, size, age and size factors, minimum age and size, storage group, migration path and retention time. This list is then ranked: a score is calculated for each file by weighing its age and size by its age and size factors, and all the files on the list are then sorted in descending order by score. The resulting list is called the candidates list.

From the candidates list, a sufficient number of files are selected and migrated to bring the file system utilization percentage down to the selected water mark. While files are being migrated, a transition file is created for each file that contains all the information necessary to restore that file if a system crash occurs during migration. Other files can also be prestaged to bring the file system utilization down to a preselected prestage water mark.

The invention may be implemented using the Virtual File System (VFS) architecture used to create the Network File System (NFS). The invention can of course also be implemented with other kinds of file systems. Details of this architecture are disclosed in Kleiman, S. R. "Vnodes: An Architecture for Multiple File System Types in Sun UNIX," Proceedings of the Usenix 1986 Summer Conference, Atlanta, Ga, Summer 1986, pp. 238–247.

Figure 9:
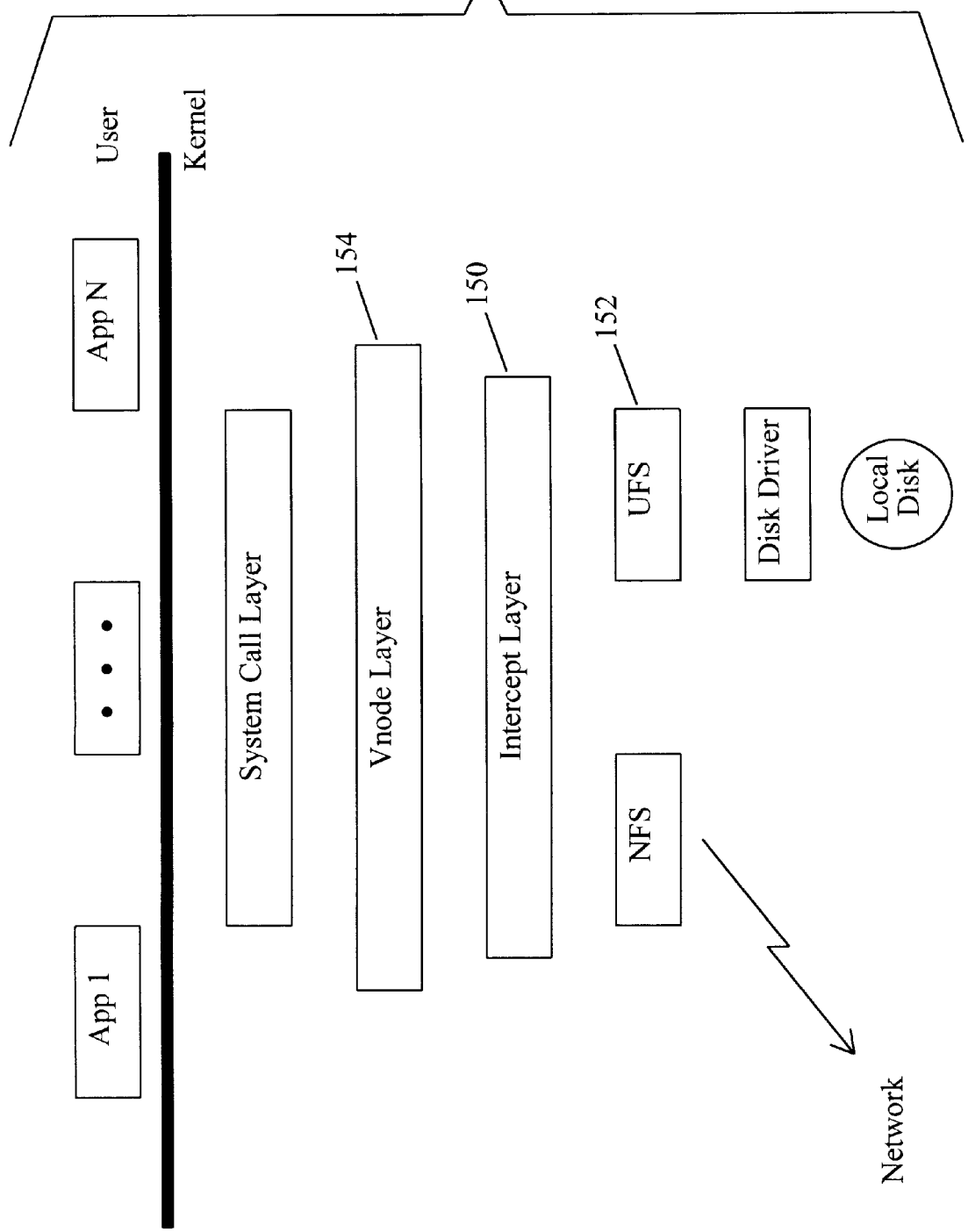
FIG. 9 is a schematic of a file management system using an embodiment of the present invention.

FIG. 9 illustrates the implementation of the present invention in a VFS architecture. The intercept layer 150 contains the intercept routines that intercept vnode procedure calls and the additional functionality that performs the special handling. In the preferred embodiment, the intercept layer 150 performs the functions of migration and can also be referred to as the migration layer. The intercept layer 150 in other embodiments also handles such things as compression, encryption, or logging access to files. The intercept layer 150 can be written to be file system independent. Consequently, embodiments of the present invention are easily portable between different underlying file systems. For example, the preferred embodiment can be used with Berkeley UNIX file systems, AT&T UNIX file systems and MS-DOS file systems. Prior art approaches that depend on inode numbers have no ability to work with MS-DOS.

In the preferred embodiment, the interception is accomplished by replacing the vnode operators vector of the underlying file system with a vector containing references to points of entry in the intercept layer 150. The intercept layer 150 performs any necessary migration specific tasks, and then passes the intercepted vnode procedure call down to the Unix File System (UFS) 152 for normal processing. For example, if the Vnode layer 154 issues a rdwr( ) call requesting to read data from a file located on the Local Disk 156, a procedure in the intercept layer 150 intercepts the call to rdwr( ). This procedure then determines whether the file is a stub file, in which case the procedure will issue a reload request causing the migrated file's contents to be reloaded onto the Local Disk 156. At that point, the procedure will issue a call to the rdwr( ) procedure that is part of the UFS 152. If, on the other hand, the procedure had determined that the referenced file was not a stub file, it would immediately have called the rdwr( ) procedure from the UFS 152.

FIGS. 10a–g illustrate a portion of the migration layer in one embodiment of the invention. In this embodiment, the only intercepted calls necessary for migration are rdwr( ), getattr( ), setattr( ), getpage( ) and map( ). For purposes of implementing out-of-space protection, the following calls are intercepted as well: create( ), link( ), rename( ), mkdir( ) and symlink( ). Out-of-space protection, as the term suggests, simply refers to protecting the referenced vnode procedure calls from error conditions resulting from insufficient free disk space. As illustrated in FIG. 10g for the example of mufs_mkdir( ), these latter calls simply call their UFS version. If an ENOSPC error is returned, the intercept routines call mfs_getspace( ) procedure in order to attempt to free up disk space on the Local Disk 156, and then call the UFS procedure again. The other intercepted calls operate in accordance with FIGS. 10a–10g.

As illustrated in FIGS. 10a and 10b, the intercept version of the rdwr( ) call, which is named mufs_rdwr( ), receives the arguments prescribed by the VFS interface. The interface layer of FIGS. 10a and 10b use some unused fields of the vnode vflag structure to store migration-related information, such as the flags VMFSBUSY and VMFSRELOAD.

The first if statement of mufs_rdwr( ) determines whether the file referenced by the variable is already in the process of being reloaded. The next if statement determines whether the referenced file has an unusual set of attributes, in this case, the size MAGIC_SIZE. If the file does not have that size, the examination of its contents can be avoided, as can be seen from FIGS. 10c and 10d where it is illustrated that the function branches to the code that calls the UFS's rdwr( ) procedure.

If the file has the specified size, the mufs_rdwr( ) procedure calls the mfs_mi( ) procedure which is illustrated on FIGS. 10c and 10d. This function sets the VMFSBUSY flag and calls mfs_readmi( ), which is illustrated on FIGS. 10e and 10f. This procedure reads the referenced file from the disk assuming it is a stub file. In this implementation stub files contain specific data in bytes 512 through 989. As will be recalled in the discussion of FIG. 5, above, one of these data is the unique pattern that serves to identify a file as a stub file. Consequently, the mfs_readmi( ) procedure obtains the specified bytes of the suspected stub file using the UFS rdwr( ) call, and compares the bytes obtained, stored in buff, with the pattern, stored in mfspattern, using a block compare procedure (bcmp). If the block compare finds the specific pattern, i.e., returns non-zero,. the file is a valid stub file. In that case, the "bfid", "size," and "blocks" fields in the mi data structure are loaded with the bitfile ID, the size of the migrated file in bytes and the size of the migrated file in blocks, respectively, the values of which are obtained from the stub file. Otherwise, the mi data structure remains unchanged. The first statement in the mfs_readmi( ) procedure set the size field of this data structure to be negative one (−1). If the mfs_readmi( ) procedure returns with mip→size still equal to −1, that indicates that the special pattern was not found and the file is not a stub file.

Upon return from mfs_readmi( ), the procedure mfs_mi( ) calls mfs_rele( ). This procedure turns off the VMFSBUSY flag. This flag was originally set in mfs_mi( ) prior to the call to mfs_rele( ) in order to prevent another process from attempting to access the stub file while mfs_readmi( ) was reading the contents of the stub file.

The operations performed by mufs_rdwr( ) upon return from mfs_mi( ) are illustrated on the top of FIGS. 10c and 10d. If the size field of the mi data structure is −1, then the file is not a stub file; it was merely a coincidence that the file's size was MAGICSIZE. If mi.size is −1, the mufs_rdwr( ) procedure branches to the code that calls the UFS rdwr( ) procedure. Otherwise it checks the flags associated with data access-control mode, a subject described in more detail below. The procedure then determines whether (1) the rdwr( ) call is a request to read from the file, as opposed to write to it, and if so (2) whether the read request can be satisfied by the file leader consisting of that first 512 bytes of the file. If so, the procedure branches to the code that calls the UFS rdwr( ) procedure. Otherwise, the procedure causes the file to be reloaded with the call to mfs_reload( ), and, after this procedure has returned, calls the UFS rdwr( ) procedure.

The other vnode procedure calls intercepted by the intercept layer for purposes of providing access to files operate in a way very similar to the mufs_rdwr( ) procedure and could be coded by a person of ordinary skill in the art using the information and source code described above.

The vnode procedure calls that are intercepted for purposes of implementing out-of-space protection will call mfs_getspace( ) if they catch an ENOSPC condition. As illustrated in FIG. 10g, the mfs_getspace( ) procedure goes to sleep and waits for a signal that more space is available. The space is made available by a daemon that periodically polls the kernel looking for a process that is hung up on an ENOSPC condition. If it finds one it frees space by turning prestaged files into stub files and/or implementing demand migration. Thus, the responsibility for providing the illusion of infinite space is provided by a cooperation of the user program (via the intercept layer) and the spaceguard daemon.

In another mode of practicing the invention, all of the vnode procedure calls are intercepted. In that embodiment, the only intercept procedure that results in a call to mfs_readmi( ) is mfs_lookupo. The operation of mfs_readmi( ) in this implementation is illustrated in FIGS. 11a and 11b. As can be seen, the size of the file is obtained from the inode, and if the size is not the magic size, the procedure mfs_readmi( ) simply returns, avoiding the remainder of the processing performed by mfs_readmi( ).

However, if the size is the magic size, mfs_readmi( ) proceeds to obtain the migration information and to perform the block compare of bytes 512–912 with mfspattern as in the embodiment of FIGS. 10a–g. However, if it is determined that the file is a valid stub file, the m_stub flag of the data structure pointed to by mp is set to 1. The real vnode for the referenced file is pointed to by the m_rvp field of the mfs_node data structure. This vnode is replaced in the vnode layer 154 of FIG. 9 by a pointer to the m_mv field of the mfs_node data structure. The real vnode can be retrieved by the VTOR macro, and the original inode information can be accessed using the real vnode.

Using the above procedure, the migration information is read from the disk and stored in the vnode once, i.e., at the time a file is first referenced by the lookup( ) procedure, which must be called for every file prior to access. Thereafter, the other vnode call intercept procedures, such as mfs_rdwr( ), simply test the state of the m_stub flag and avoid having to reload the migration information from the disk in order to determine whether a file is a stub file. This latter advantage is illustrated in FIGS. 11c and 11d, showing the operation of the mfs_rdwr( ) in this alternative embodiment of the invention.

Reloading of a file is handled by a daemon named migind which uses a pseudo-device driver to communicate with the vnode operation intercept routines to obtain the information necessary to copy the migrated file over the network. The intercept layer maintains a linked list of mfs_node data structures, which are illustrated in FIGS. 11a and 11b. Each item on this linked list corresponds to a migrated file for which a reload request has been issued. The migind daemon periodically checks the linked list via ioctl( ) calls to the pseudo-device driver. If the list is not empty, the migind daemon obtains the bitfile ID of the files to be reloaded from the mfs_node structure using a call to ioctl( ) and uses the bitfile ID to copy the file across the network to the local disk. There are many ways for doing this copy known to persons with ordinary skill in the art. The migind daemon also obtains the inode number, the inode generation number and the inode's ctime and uses these values to make the file identification key, which is then stored in the shadowed-file database.

The present invention also uses shadowed files, as shown in FIG. 3. A shadowed-file 40 is a resident file for which a copy 42 also exists on the migration store 30. A file becomes shadowed in either of two ways. One way a file can become shadowed is when a previously migrated file is reloaded. The other way a file becomes shadowed is when it is prestaged. Prestaging is the copying of a file to a migration store without making it non-resident, that is, without deleting the original file or truncating the original file to turn it into a stub file. The present embodiment prestages resident files to create a buffer zone of file space that can be released rapidly when a file system is dangerously low on space. Prestage files can be turned into non-resident files much more quickly than files that have not been prestaged.

Unlike the stub files of nonresident files, shadowed files do not contain information about the location of their store copy, that is, they do not contain the bitfile ID. In fact, shadowed files are in all ways identical to the original file, which is a major advantage in the ability to move data from the file system where the file is shadowed to another file system that might not be connected to the migration store containing the migrated file. Instead, this information is kept in a shadowed-file database 44, illustrated on FIG. 3. The shadowed-file database is "advisory". No user data can be lost if a database is lost or restored from an older version.

The shadowed-file database 44 contains entries (or records) each containing one key field 46 and one value field 48. The key 46 is a structure containing two members: the file identifier (FID in Vnode/vfs terminology), and the file's inode modification time or "ctime." This key 46 can be thought of as identifying a particular version of a file. The value field 46 contains the bitfile ID. An entry in this database 44, then, means that a copy of a particular version of a file exists on the store and can be retrieved using the given bitfile ID.

An entry in this database 44 is created in two situations: when a file is prestaged (copied to the store but left resident), and when a file is reloaded for reading (copied from the store and made resident). A shadowed-file database entry is removed in two situations: when a file is made nonresident (because the stub file for the nonresident file contains the necessary migration information), and when a periodic maintenance job determines that an entry is no longer valid. It does this by scanning the database and checking to see that the version of the file corresponding to each entry's key still exists. If not, the entry is removed.

A shadowed file can become non-resident simply by truncating it to a stub file, copying the bitfile ID from its database entry to the stub file, and deleting its database entry. Copying the contents of the shadowed file to the migration store is not necessary because the migration store already contains the bitfile for that file.

When a shadowed file is copied, the new copy is not shadowed because it has a different file identifier in ctime. If reloading one or more files requires that other files be migrated to free up space for the reloaded files, the candidate's list, shadowed-file database and the migration store are affected in the same way as described above in connection with prestaging of files.

A migration system using the present invention can also include a command that allows users to modify this and other migration-related behavior. In the preferred embodiment this command is named "migmode" and controls the execution of other commands. The execution control can be one of several independent execution modes, which are also inherited by any child process of the command run under migmode. In the preferred embodiment, the three execution modes are as follows: data access-control mode, time stamp-control mode, and out-of-space protection mode.

Data access-control mode controls how nonresident files appear to the command run under migmode. Data access-control mode settings include the following: the normal or transparent setting, wherein access to migrated files causes reloading; the stub setting, wherein access to migrated files accesses the stub file; the zero length setting, wherein migrated files appear as zero length files; and the error setting, wherein access to migrated files returns an error. Only the normal setting triggers reloading of a migrated file referenced by the command running under mignode.

FIGS. 10c and 10d illustrates how data access-control mode may be implemented in an embodiment of the invention. After determining that a file is a stub file, the mufs_rdwr( ) procedure consults the state of the lowest three bits of the u_mfsflag field which are bits in the user block that are unused in SunOS 4.1.3. If the value of those bits is MFS_DM_STUB, the rdwr( ) call was made under the stub setting of data access-control mode. Consequently, mufs_rdwr( ) simply reads (or writes) the stub file itself without reloading. If the value of the bits is MFS_DM_ZLEN, then the rdwr( ) call was made under the zero length setting of data access-control mode, and mufs_rdwr( ) simply returns without reading or writing anything, giving the referenced file toe properties of a zero length file. Finally, if the value of the bits is MFS_DM_ERROR, rdwr( ) was called under the error setting of data access-control mode, and mufs_rdwr( ) returns an IO error to its caller. If the bits have none of these values, rdwr( ) was called under the normal setting of data access-control mode, and mufs_rdwr( ) proceeds to reload the file (if it cannot be satisfied with the file leader).

One of the most useful applications of the stub setting is to speed up back-ups of a file system that has some of its files migrated elsewhere. Backup utilities that read files in the file system, such as cpio and tar, running with the stub setting, do not trigger reloads of nonresident files, making backups much faster and noninterferring, (i.e., the set of resident files is not changed).

The stub setting also allows users to make copies of their own stub files, either for themselves or to share with other users. In this way for example, one user could purposely migrate a large directory tree and then copy the stub files for that directory tree to a number of other users. Each of these other users would then require and use only a small amount of space to maintain a copy of the otherwise large directory tree.

The zero length setting allows users to not only prevent reloading of nonresident files, but to not even see the contents of the stub files for those nonresident files. This would be of use, for example, when a user wants to do a pattern search (for example grep) on a large directory tree but only wants to access resident files in that directory tree.

The second execution mode of the migmode command is the time stamp-control mode. Time stamp-control mode controls whether a file access time is set to the current time when it is accessed. Time stamp-control mode settings include the following: the normal setting, wherein access times are set in the normal way; and the preserve setting, wherein access times and inode-change times (atime and ctime) are not changed when the file is read.

The primary purpose of the preserve setting is to solve the problem of access times being modified when backups are done using utilities that read files through the file system. By using the preserve setting when they run backups, system administrators can save themselves the task of having to reset access times and the attendant problems that result when inode-change times are updated because access times were changed.

FIGS. 10c and 10d illustrates how time stamp-control mode may be implemented in an embodiment of the invention. Following the label "r", the mufs_rdwr( ) procedure tests the value of the amode flag. If the value of the flag is true, the rdwr( ) call was made under the preserve setting of the time stamp-control mode. Consequently, the inode change time is stored in the temporary variable "atime", the call to the UFS's rdwr( ) is made, and then the inode change time is reset to the value of atime. If the amode flag is false, the rdwr( ) call was made under the normal setting of the time stamp-control mode, and changes to the inode change time are not prevented.

The third execution mode of the migmode command is the out-of-space protection mode. Out-of-space protection mode controls the handling of out-of-space errors, such as ENOSPC errors, returned by the kernel. Out-of-space protection mode settings include the following: the normal setting, wherein the file migration system attempts to recover from out-of-space conditions and avoid returning ENOSPC to user processes if at all possible; and the error setting, wherein no attempt is made to intercept ENOSPC conditions. The out-of-space protection mode can be used for processes that require special handling of out-of-space conditions.

The error setting of out-of-space protection mode is implemented in the mfs_getspace( ) procedure, as illustrated in FIGS. 10e–f. The mfs_getspace( ) procedure tests the value of the flag MFS_SM_ENOSPC. If the flag is on, the call to the vnode procedure that caught the ENOSPC condition was made under the error setting of the out-of-space protection mode, and out-of-space protection is suppressed by mfs_getspace( ) returning to its caller without waiting for the spaceguard daemon to free space.

The present invention provides for performing migration based on a flexible policy by which the migration machinery during periodic or demand migration selects files to migrate and decides where to migrate them to. System administrators can specify values for several migration policy factors, in one embodiment of the invention up to ten migration policy factors. The system has default values for each of these factors. These may be defined in configuration files which system administrators can edit. The following factors are examples of migration policy factors: water marks (high, low, prestage), directory names, minimum age, minimum size, a factor to weight the age of files to be migrated, a factor to weight the size of files to be migrated, storage group, migration path, retention time, and files to be excluded from migration.

Water marks control the timing and amount of periodic and demand migration. The high water mark specifies the file system utilization percentage at which the process of the present invention will begin migrating files to increase free space. Migration continues until the low water mark or prestage water mark is reached. An example of a default value for the high water mark is 90%. The low water mark specifies the file system utilization percentage at which the process of the present invention will stop migrating files and, if prestaging is in effect, will start prestaging files. If the low water mark and the prestage water mark are equal, no prestaging is done. An example of a default value for a low water mark is 80%. The prestage water mark specifies the file system utilization percentage at which the process of the present invention will stop prestaging files. An example of a default value for a prestage water mark is 70%. Minimum age and minimum size specify thresholds at or below which files will not be migrated. Minimum age is the minimum number of days since a file was last referenced. The default for minimum age is one. Minimum size is the minimum number of one kilobyte block. The default for minimum size is ten. The age and size factors specify weights to assign to a files age and size to give one of these attributes priority over the other for migration. The default value for the age factor is one. The default value for the size factor is one.

This embodiment of the present invention also provides a means for excluding a file from migration. The system administrator can maintain a list, called a lock list, in a file. This list specifies the files or path names that should be excluded from migration.

Storage group and migration path are two symbolic attributes that are attached to a file when it is migrated. System administrators can migrate files into different storage groups within a migration store, and can associate different migration paths with files that govern a file's subsequent migration among levels of the storage group. Both help place and maintain migrated files in a migration store.

Retention time is the length of time a bitfile should be retained on a store after it no longer has a corresponding stub file or shadowed-file database entry. Retention times allow bitfiles to be retained for a specified period of time so that pointers to the bitfiles existing in some other place, such as on a backup tape, can later be used to retrieve the file. The default value for retention time is 999. A retention time of zero is used to specify infinite retention time.

The process of detecting and removing "stale" bitfiles from a migration store is complicated by the fact that a single bitfile can be pointed to by multiple copies of the original stub file for that bitfile. If stub files were never copied, there would be only one pointer to each bitfile, either a stub file or a shadowed-file database entry. If the stub file or shadowed-file were removed, the bitfile would be removed. Because of the flexibility of the preferred embodiment of the present invention, however, a bitfile will typically have multiple points to it. The most common cause of this is backup. Because it is usually undesirable for a backup program to trigger reload, the preferred embodiment of the present invention provides a mode in which a process that accesses nonresident files sees only the stub file and does not trigger reloading. While this capability was designed primarily for file system backup programs such as cpio, it gives users the ability to copy stub files arbitrarily, within a file system, between files systems, or even between systems. Cloning a disk with the UNIX utility dd also complicates bitfile pointers.

The solution chosen in the preferred embodiment for determining the appropriate time to remove a bitfile from a migration store is to associate a retention time with each bitfile. This is done at the time the bitfile is created. It is same as the retention time specified in the bitfile's parent directory on the original file system during initial configuration of that file system. A program that runs periodically on the store decrements the retention time of each file in the store; if the counter reaches zero, the bitfile is removed. The frequency at which the periodic store program runs determines the units of the retention time.

In addition, any client of the store can reset the retention time of a given bitfile. A program that runs periodically on the client examines all of its file systems, and for each stub file or shadowed-file database entry, refreshes the retention time of the corresponding bitfile to its initial value. This refresh procedure keeps the bitfile "alive". If a client system is down for several days, the retention time of its bitfiles counts down. As long as the client system comes back before the retention times reach zero, it can refresh them.

In another embodiment of the invention, the files that are migrated are replaced by symbolic links to the file copied to the migration store. As described above, an intercept layer recognizes the symbolic links as references to migrated files by the path information in the symbolic link. The intercept layer also reloads the migrated files when necessary.

The principles used to construct the file management system for processing requests to access migrated files described above are equally applicable to file management systems for managing files requiring other kinds of special handling. For example, the principles of the present invention can be used to provide a modified file system that saves storage space by compressing files and maintains the files so that their compressed state is transparent to the user.

Figure 7:
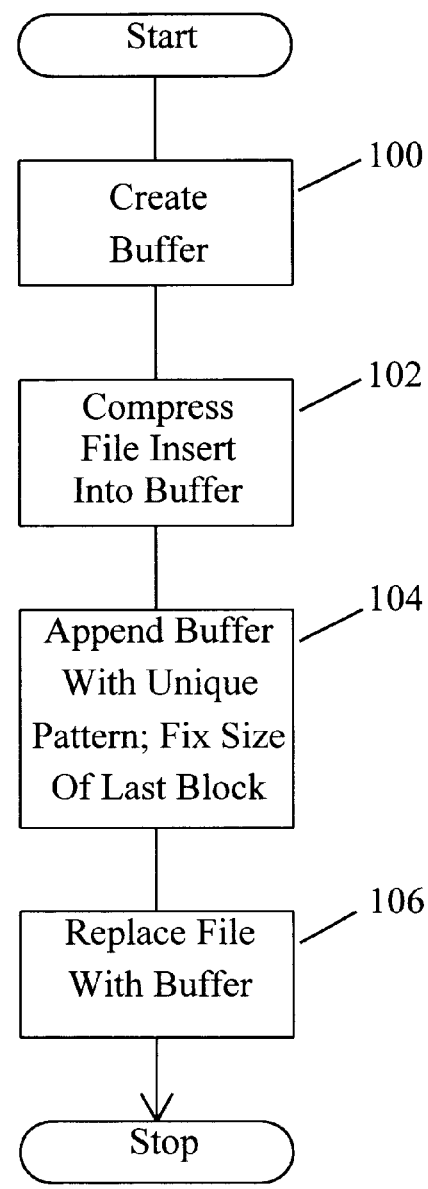
FIG. 7 is a flow chart illustrating a compression process of the present invention.
Figure 8:
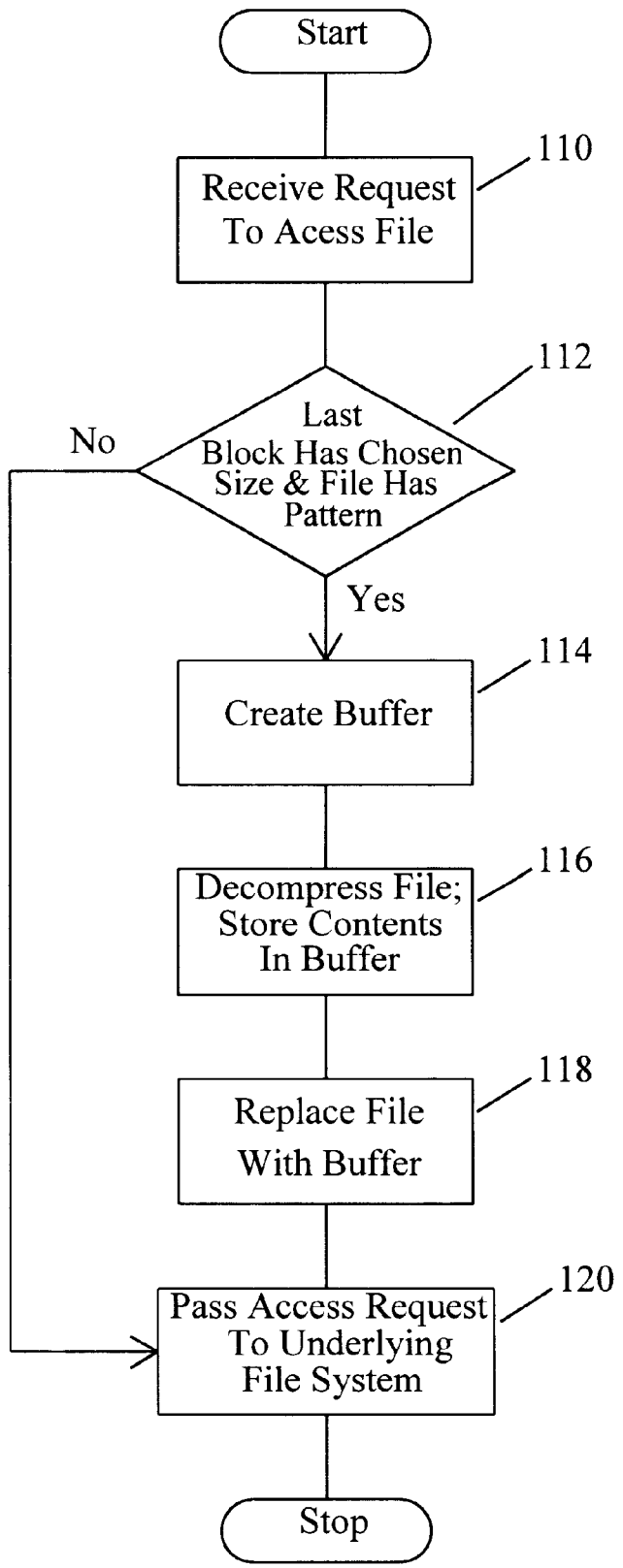
FIG. 8 is a flow chart illustrating one process of accessing a compressed file using the present invention.

FIGS. 7 and 8 are flow charts for implementing an example of such a system. FIG. 7 illustrates the compression process. In the first step 100, a buffer is created for temporarily holding the compressed file. In the step 102, the file is compressed using a predetermined compression routine. The results are inserted in the buffer. Then a pad of bytes and a unique pattern of bits is appended to the file, step 104. The length of the pad is chosen so that the last data block of the file has a predetermined length, such as 1023 bytes. The pattern is used to identify the file as a compressed file. Finally, the uncompressed file is replaced with the contents of the buffer in the last step 106.

The process that is followed whenever a file's contents are accessed is illustrated in FIG. 8. When the system receives a request to access the contents of a file, step 110, it examines the size of the file stored in the inode to determine whether the file ends with a block having the predetermined length, such as 1023 bytes. If so, the system determines whether the file also contains the unique pattern that identifies it as a compressed file (step 112). If the file does not end with such a block or does not have the unique pattern, the system simply passes the access request to the underlying file system (step 120) for further processing in the normal way. If the file does end with a block having the chosen length and has the unique pattern, the system decompresses the file and replaces the compressed file with the decompressed file in a series of steps 114, 116 and 118. Now, the file appears as though it had never been compressed and is ready for processing by using the underlying file system's access routines, step 120.

Similarly, the invention can be used to provide a system for transparently managing encrypted files. The above-described processes would work by replacing the compression and decompression steps with encryption and decryption steps. If the file is determined to be an encrypted file in the second step 112 of FIG. 8, the system then determines whether the process that issued the request for access has permission to decrypt the referenced file, and, if so, the system provides the decryption key. Alternatively, each user on a system has a decryption key associated with the user's account, and if the system tests YES in step 112, the system obtains the key for the user ultimately responsible for the access request. Other ways of implementing secure encryption/decryption of files will be known to persons of ordinary skill in the art.

The processes of FIGS. 7 and 8 could also be used to transparently log each time a specified file is accessed. The specified file would end with a block having the predetermined size and would contain the unique pattern. Each time the intercept layer intercepted a request to access the file, it would add an entry to a log file, specifying desired information such as the time of access and the owner of the process issuing the access request.

This invention is also useful for residency maps. A residency map is a map that indicates which segments of a file have been migrated and which segments remain resident. Residency maps are useful partially resident files. For example, a file that is 20K in length can have the entire file stored on a migration store and three different 512 byte segments in the stub file. The residency map indicates that these three segments are in the stub file.

With this invention the residency map is stored in the file and the length of the file is fixed so that the last data block has a predetermined size, such as 1023 bytes.

What is claimed is:

1. A file management system, comprising,
   a layer that intercepts at least one code path by which a program requests access to a first file from an underlying file system;
   a file management procedure that performs special handling on a file;
   a branch in said layer that branches to a first call in said layer to said file management procedure based on a decision made by examining at least one normal attribute of the file referenced in the intercepted access request by examining the file itself;
   a second call in said layer to said accessing procedure of said underlying file system.

2. The file management system of claim 1, wherein said file management procedure comprises a procedure for reloading a migrated file.

3. The file management system of claim 1, wherein said file management procedure comprises a decompression procedure.

4. The file management system of claim 1, wherein said file management procedure comprises a decryption procedure.

5. The file management system of claim 1, wherein said at least one normal attribute comprises the length of the file.

6. The file management system of claim 1, wherein said at least one normal attribute comprises a timestamp for the file.

7. The file management system of claim 1, wherein said at least one normal attribute comprises an owner identification.

8. The file management system of claim 1, wherein said branch branches to said first call based on a decision made by examining the contents of the file.

9. A file management method comprising the steps of,
  intercepting at least one code path by which a program requests access to a first file from an underlying file system;
  examining at least one normal attribute of the file that is referenced by said request by examining the file itself;
  responding to said examining step by conditionally calling a file management procedure;
  calling said accessing procedure of said underlying file system.

10. The method of claim 9, wherein said examining step comprises determining the length of a data block of the file.

11. The method of claim 9, wherein said responding step calls said file management procedure only if said normal attribute has a preselected value.

12. The method of claim 9, wherein said at least one normal attribute comprises a timestamp for the file.

13. The method of claim 9, wherein said at least one normal attribute comprises the length of the file.

14. The method of claim 13, wherein said preselected value of said attribute is the length of a data block of said file.

15. The method of claim 13, wherein said examining step further comprises determining whether the file contains a unique pattern of bits.

16. The method of claim 12, wherein said file management procedure comprises a procedure for reloading a migrated file.

17. The method of claim 16, wherein said reloading procedure copies a migrated file from a first repository to a second repository and wherein said first and second repositories are both local to the same computer.

18. The method of claim 16, wherein said reloading procedure copies a migrated file from a first repository to a second repository and wherein said second repository is local to a computer and said first repository is accessible to said computer via a remote connection.

19. A file migration method comprising the steps of,
  examining at least one normal attribute of a first file by examining the file itself; and
  responding to said examining step by calling a file reloading procedure only if each of said at least one normal attributes has a predetermined value;
  wherein said file reloading procedure uses information stored in the first file to reload a migrated file corresponding to the file.

20. The file method of claim 19 wherein said at least one normal attribute comprises length.

21. A file management system comprising:
  means for intercepting at least one code path by which a program requests access to a first file from an underlying file system;
  means for examining at least one normal attribute of the file that is referenced by said request by examining the file itself;
  means for responding to said examining step and for conditionally calling a file management procedure;
  means for calling said accessing procedure of said underlying file system.

22. A system for storing and retrieving information, comprising:
  a computer having a first data storage repository and access to a second data storage repository;
  a file system accessible to said computer that includes a procedure for accessing files stored on said first repository;
  said computer further having a layer that intercepts calls to said file system's procedure for accessing files;
  a first file stored on said second repository; and
  a second file stored on said first repository that has some of the attributes of said first file and at least one normal attribute of the file itself signifying that said second file contains information identifying the location of said first file.

23. The system of claim 22 wherein said layer comprises a procedure for determining whether an intercepted file access request requires access to data contained in said first file and not in said second file.

24. A method of migrating files, comprising the steps of:
  copying the contents of an original file from a first repository to a second repository and
  transforming said original file to an alternate representation comprising a file having a last data block of a predetermined size and including therein information identifying the location of said copy.

25. The method of claim 24, wherein said transformed file further comprises a residency map.

26. The method of claim 24, wherein said transformed file further comprises information identifying at least one extended attribute of said original file.

27. The method of claim 24, wherein said transforming step further comprises the steps of:
  storing in said transformed file a value indicative of the size of said original file before transformation; and
  preserving the rest of the attributes of said original file.

28. The method of claim 24, wherein said transforming step further comprises storing in said transforming file a unique pattern of bits.

29. The method of claim 24, further comprising,
  reloading onto said first repository at least a portion of said copy of said file.

30. The method of claim 29, further comprising,
  entering in a database a key identifying said reloaded file and a value identifying the location of said file on said second repository,
  deleting said transformed file, and
  transferring attributes of said transformed file to attributes of said reloaded file.

31. The method of claim 29, wherein said reloading step occurs in response to a request to read a portion of said original file, said portion not contained in said truncated file.

* * * * *